United States Patent

Berwanger

[11] Patent Number: 5,542,504
[45] Date of Patent: Aug. 6, 1996

[54] EXTERNAL CONCENTRIC AIRCRAFT BRAKE PISTON ADJUSTER

[75] Inventor: Fred W. Berwanger, South Bend, Ind.

[73] Assignee: AlliedSignal Inc., Morristown, N.J.

[21] Appl. No.: 286,300

[22] Filed: Aug. 5, 1994

[51] Int. Cl.$^6$ ................................................ F16D 65/54
[52] U.S. Cl. ................................. 188/71.8; 188/196 R
[58] Field of Search ............................. 188/196 R, 196 A, 188/351, 196 P, 71.8, 71.4

[56] References Cited

U.S. PATENT DOCUMENTS

| | | | |
|---|---|---|---|
| 3,542,165 | 11/1970 | Luckon . | |
| 3,729,072 | 4/1973 | Borkowski | 188/71.8 |
| 3,949,843 | 4/1976 | Holcomb, Jr. | 188/71.8 |
| 4,006,669 | 2/1977 | Price . | |
| 4,186,825 | 2/1980 | Milliken | 188/196 R |
| 4,192,407 | 3/1980 | Crossman | 188/71.8 |
| 4,724,741 | 2/1988 | Wirth . | |
| 4,815,359 | 3/1989 | Black . | |
| 5,154,262 | 10/1992 | Berwanger . | |
| 5,205,382 | 4/1993 | Edmisten . | |
| 5,219,046 | 6/1993 | Clark . | |

Primary Examiner—Matthew C. Graham
Attorney, Agent, or Firm—Larry J. Palguta; Leo H. McCormick, Jr.

[57] ABSTRACT

The external concentric aircraft brake piston adjuster assembly (10, 100, 200) comprises in a piston housing (12, 112, 212) a housing bushing bore (19, 119, 219) having disposed slidably therein a brake piston (30, 130, 230) with a shoulder (35) abutted by a deformable member or adjuster tube (40, 140, 240) of the assembly (10, 100, 200). The deformable member (40, 140, 240) has a second end (42, 142, 242) extending exteriorly of the bore (19, 119, 219) and is engaged by a brake piston adjuster (11, 11', 11", 111', 211') that includes a radially inwardly extending end (54) of a deforming member or collar member (50). The collar member (50) includes the first end (51) disposed opposite and adjacent a first end (62) of the nut member (60), first ends (51, 62) including steps (53, 63) receiving and positioning a resilient member or disc spring (70). As the piston (30) is displaced axially from the bore (19) by hydraulic brake pressure, the deformable member (41) travels with the piston (30) and displaces the collar member (50) relative to the nut member (60) and housing (12), to take up a piston return stroke clearance ("X"). As displacement of the piston (30) and adjuster tube (40) extends beyond the clearance ("X"), the collar member (50) deforms the adjuster tube (40) to effect an adjusted position of the piston (30) relative to the housing (12).

21 Claims, 7 Drawing Sheets

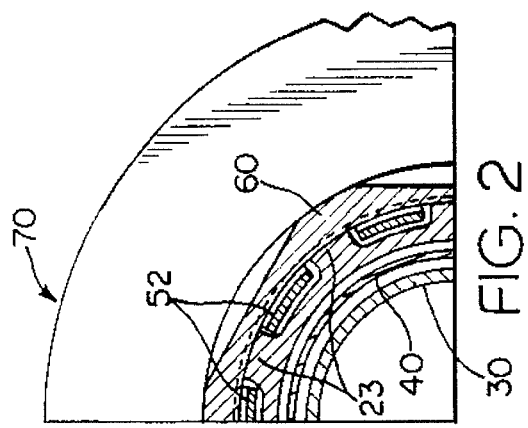
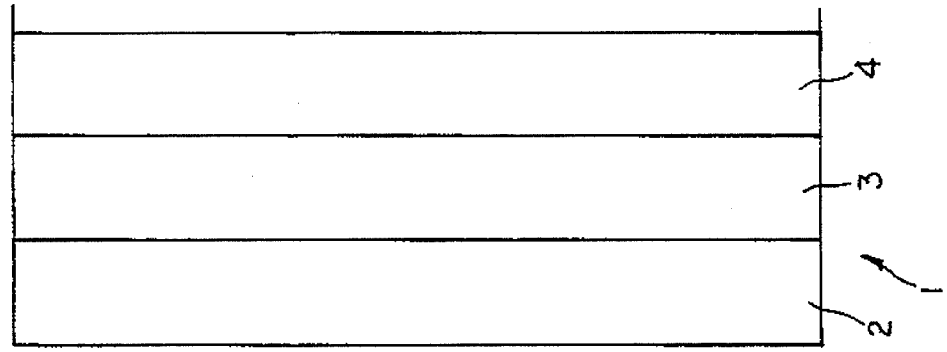
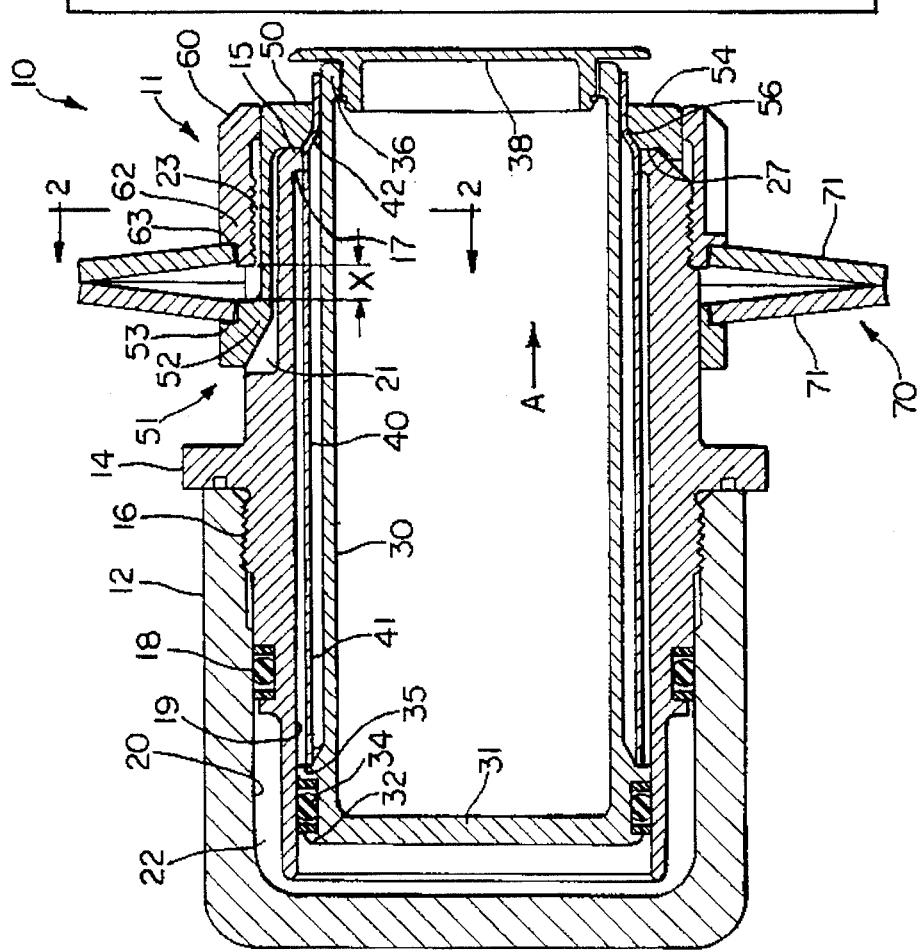
FIG. 1
FIG. 2

5,542,504

EXTERNAL CONCENTRIC AIRCRAFT BRAKE PISTON ADJUSTER

The present invention relates to aircraft brake piston adjuster assembly.

BACKGROUND OF THE INVENTION

External, non-concentric aircraft brake piston adjusters in multidisc aircraft brakes are located in the piston housing at positions circumferentially between the pistons, and transmit piston return loads through the first brake disc which is generally referred to as the "pressure plate." The return loads of such adjusters tend to distort the pressure plate, can decrease the uniformity of the distribution of brake actuation pressure during braking, and tend to increase heat transfer from the heat sink to the pistons because the pistons are continuously in contact with the pressure plate. Prior concentric piston adjusters are located within the pistons and retract the pistons away from the brake heat sink to eliminate the disadvantages of external adjusters. Such internal concentric adjusters are anchored to the brake structure by a pin inserted in a sealed gland in the piston dome. During brake actuation, structural deformations and vibrations tend to cause internal adjuster parts to chafe and wear, which often leads to adjuster pin leakage and desultory failures of adjuster components. It is highly desirable to provide a brake piston adjuster assembly which eliminates the adjuster pin and seal, and which comprises fewer parts and no small parts. It is preferable that as much as possible of the brake piston adjuster assembly be stationery relative to the piston housing so that it is less subject to vibrations from the heat sink.

SUMMARY OF THE INVENTION

The present invention provides solutions to the above by providing a brake piston adjuster assembly, comprising a brake piston slidable within a bore of a housing and extending to an open end of the bore, a deformable member located about the piston and displaceable therewith, and a brake piston adjuster including a deforming portion located externally of said bore and adjacent the open end, the deforming portion engaging the deformable member located about the piston, and resilient means biasing the deforming portion, so that movement of the piston and deformable member through the open end of the bore causes said deforming portion to move therewith and compress said resilient means such that subsequently the deforming portion deforms the deformable member as the piston moves outwardly of said bore.

BRIEF DESCRIPTION OF THE DRAWINGS

One way of carrying out the invention is described in detail below with reference to the drawings which illustrate embodiments in which:

FIG. 1 is a section view of an aircraft brake piston adjuster assembly in accordance with the present invention;

FIG. 2 is a section view taken along view line 2—2 of FIG. 1;

DESCRIPTION OF THE EMBODIMENTS

Figure 3:
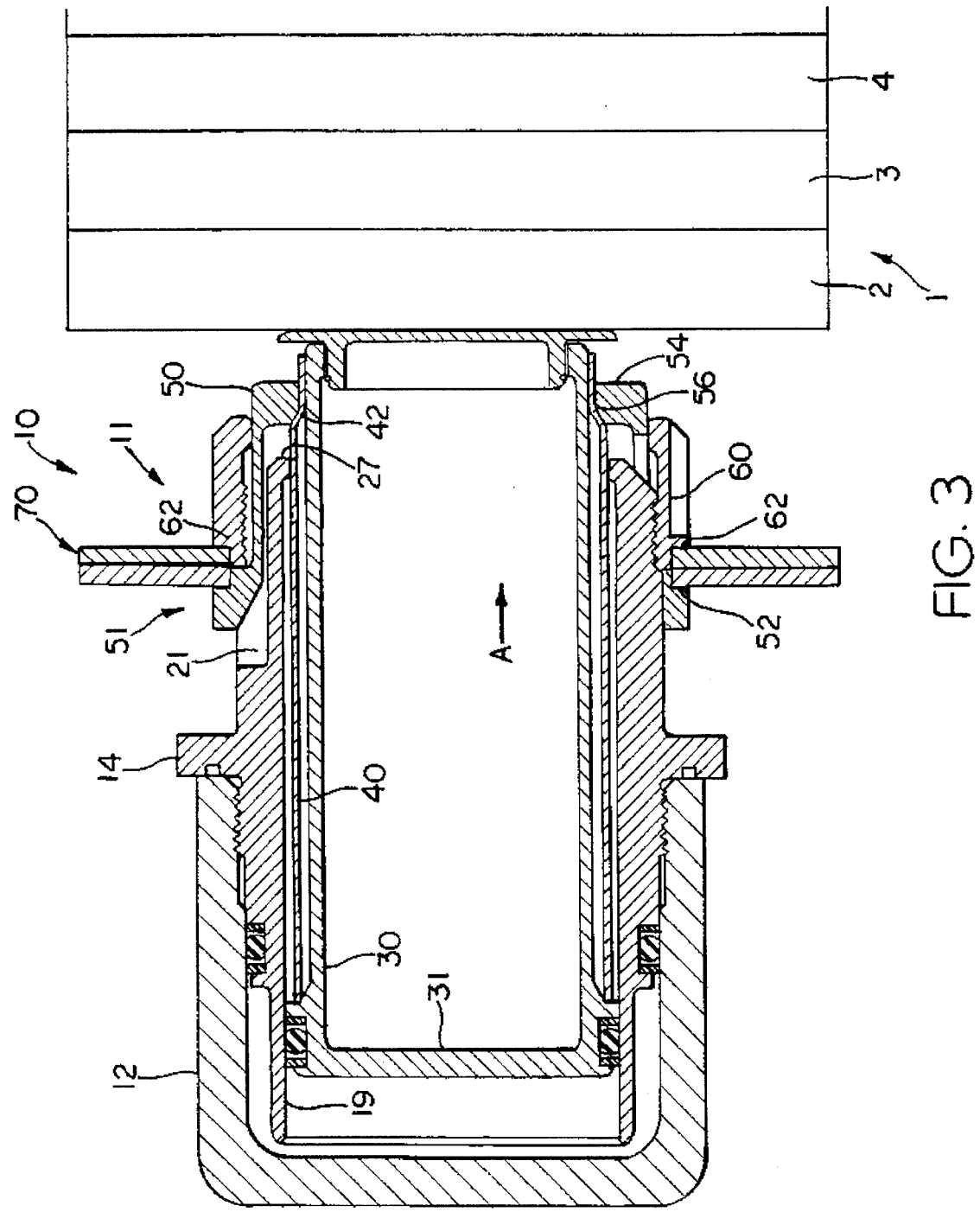
FIG. 3 is a partial section view of the brake piston adjuster assembly during actuation when the running clearance is taken up.

Referring to FIG. 1, the aircraft piston adjuster assembly is designated generally by reference numeral 10. Assembly 10 is located both within and adjacent a brake piston housing 12 which includes a typical housing bushing 14 threadedly engaging the housing at threads 16. Bushing 14 includes an external seal 18 engaging the bore 20 of housing 12, and an external radially inwardly extending bushing abutment 15 providing an interior shoulder or stop 17 for slidable piston 30. Piston 30 comprises a first end 31 extending radially to flange 32 which includes exterior seal 34 engaging housing bushing bore 19 of bushing 14, and a radially outwardly extending shoulder 35 which is abutted by a first end 41 of a deformable member or adjuster tube 40 which is part of the adjuster assembly 10. Piston 30 further includes a second or exterior end 36 receiving a piston cap 38. Located within bore 20 is a pressure chamber 22 which receives hydraulic brake fluid that displaces piston 30 axially outwardly of bushing bore 19 as hydraulic fluid pressure increases, so that piston 30 engages pressure plate 2 of brake stack 1. Deformable member or adjuster tube 40 comprises generally a cylinder which includes a second end 42 extending exteriorly of the bushing bore 19. A brake piston adjuster 11 of assembly 10 includes a deforming member or collar member indicated generally by reference numeral 50 and has a first end 51 that comprises a plurality of axially extending fingers 52 received within correspondingly positioned axial slots 21 of bushing 14. As shown in FIG. 2, the slots 21 are each located between an outer diameter portion comprising a plurality of circumferentially spaced apart splines 23 of bushing 14. The collar member 50 includes at each finger 52 of first end 51 a radially inwardly extending step 53, and includes at a second end a radially inwardly extending end 54 having a curved surface 56 that engages and deforms the deformable member 40 at second end 42. The splines 23 include a threaded portion at their outer diameter portion that is engaged by an inner threaded diameter portion of a nut member or nut means 60. Splines 23 extend axially to a bushing abutment end 27 that provides a stop for the radially inwardly extending end 54 of collar member 50. Nut means 60 includes a first end 62 having a radially inwardly extending step 63 disposed opposite and adjacent the first ends 51 and steps 53 of collar member 50. Step 63 can also be located at or near the opposite axial end of nut means 60. Received within and positioned by the radially inwardly extending steps 53, 63 of the collar member 50 and nut means 60, respectively, is resilient means or disc spring 70. Disc spring 70 includes disc members 71 which have ends that are captured within the radially inwardly extending steps 53, 63. Any type of spring locatable between steps 53 and 63 would work. A more compact type of spring may be developed according to the application.

For clarity of the drawings, dirt exclusion devices have not been illustrated.

Figure 4:
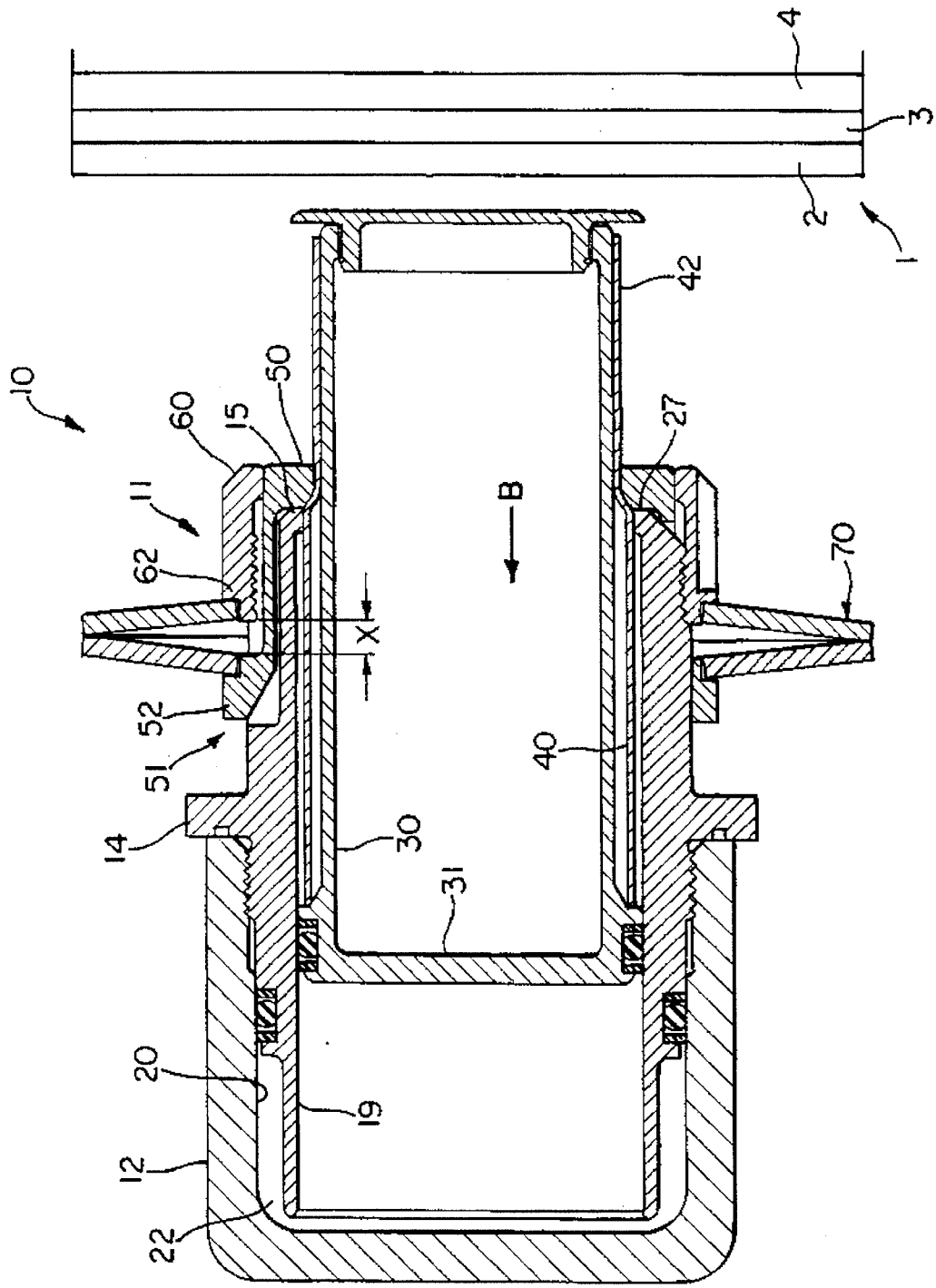
FIG. 4 is a partial section view of the brake piston adjuster assembly after adjustment and at the termination of braking.

When pressurized hydraulic brake fluid is received within chamber 22, the hydraulic brake pressure is applied to piston end 31 to force the piston axially outwardly of housing bushing bore 19. As piston 30 moves in the direction of arrow A in FIG. 1, the deformable member or adjuster tube 40 is displaced with it. As shown in FIG. 1, the piston return stroke "X" is the axial distance between the adjacent first ends 52 and 62 of the collar member and nut means, and provides running clearance for the brake. As piston 30 and adjuster tube 40 move in the direction of arrow A, the piston engages the pressure plate 2 of the brake stack 1 to effect compression of the multiple discs comprising rotors 3 and stators 2 and 4. When piston 30 has extended at full brake pressure, the clearance "X" has been taken up and reduced to 0 as shown in FIG. 3. As the brake stack 1 wears, the piston will be biased further axially in the direction of arrow A shown in FIGS. 1 and 3 so that the clearance "X" (FIG. 1) is exceeded. As this occurs, piston 30 forces the adjuster tube 40 through radially inwardly extending end 54 and curved surface 56 (the collar's swaging inner diameter) of collar member 50 to permanently deform adjuster tube 40 and effect a repositioning of collar member 50 relative to the adjuster tube 40 and piston 30 and effect adjustment of the brake piston. At the termination of braking, the disc spring 70 biases the first end 52 of collar member 50 axially away from the first end 62 of nut means 60, in the direction of arrow B in FIG. 4, to reestablish clearance "X". The length of the axial travel of the collar member 50 between its two axial stops comprising nut means first end 62 and bushing abutment 15, comprises the running clearance effected during piston retraction. As shown in FIG. 4, the brake stack 1 has experienced wear, so that brake piston 30 and adjuster tube 40 attain an adjusted position relative to collar member 50, bushing 14 and housing 12.

Figure 5:
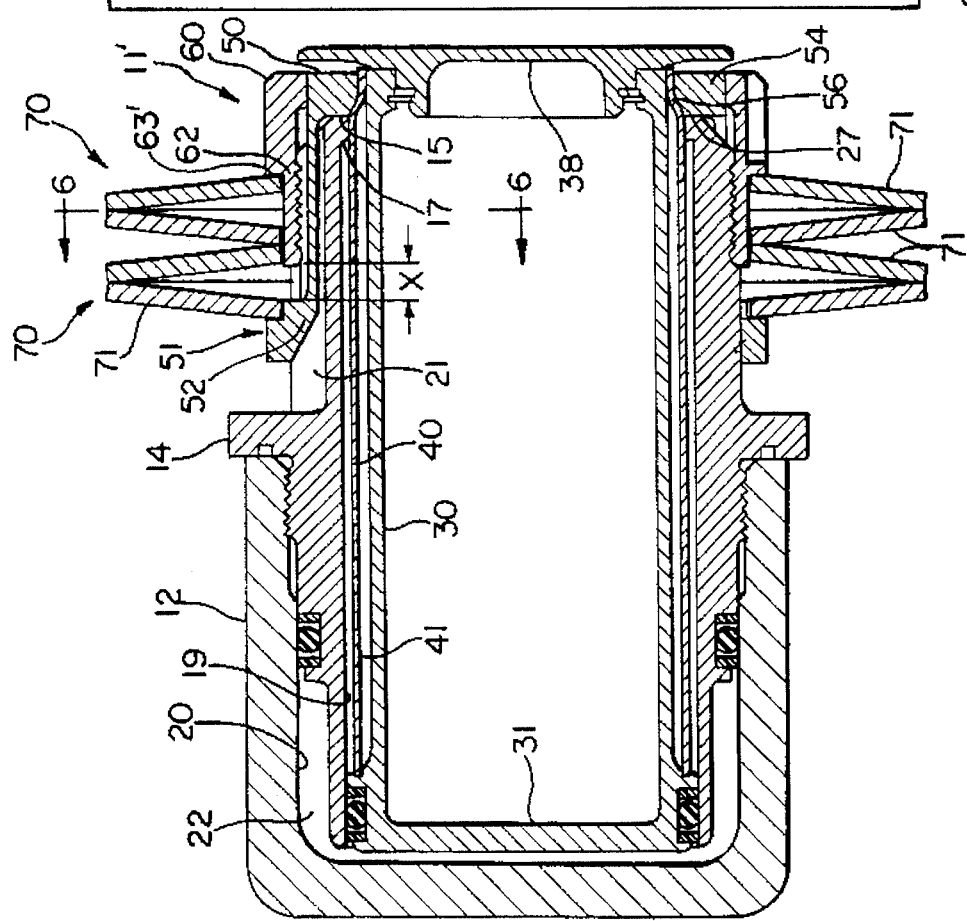
FIG. 5 is a section view of the present invention similar to FIG. 1 but including two disc springs.
Figure 6:
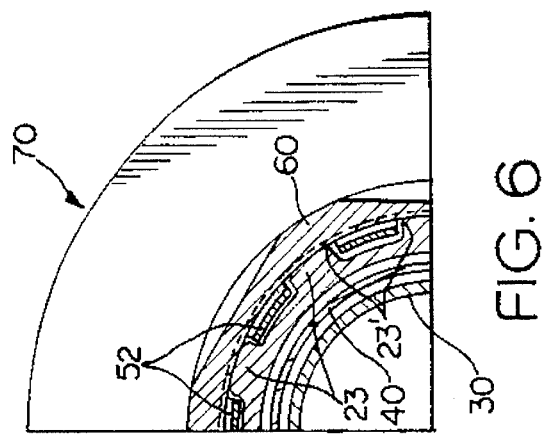
FIG. 6 is a section view taken along view lines 6—6 of FIG. 5.

FIG. 5 was a section view of an aircraft brake piston adjuster similar to that in FIG. 1. The resilient means may comprise any number of disc springs 70 which extend between the first ends 51 and 62 of the collar member and nut means, respectively. The radially inwardly extending step 63' includes a longer axial surface to accommodate the additional disc spring 70. Partial section view 6 illustrates that the spaced apart splines 23 of bushing 14 include chamfers 23' at opposing circumferential edges so that the threads on the splines 23 do not have sharp edges such as would be present at the approximately perpendicular corners illustrated in FIG. 1, and to provide space for fillets where the fingers 52 connect to the revolved section of the collar member 50.

Figure 7:
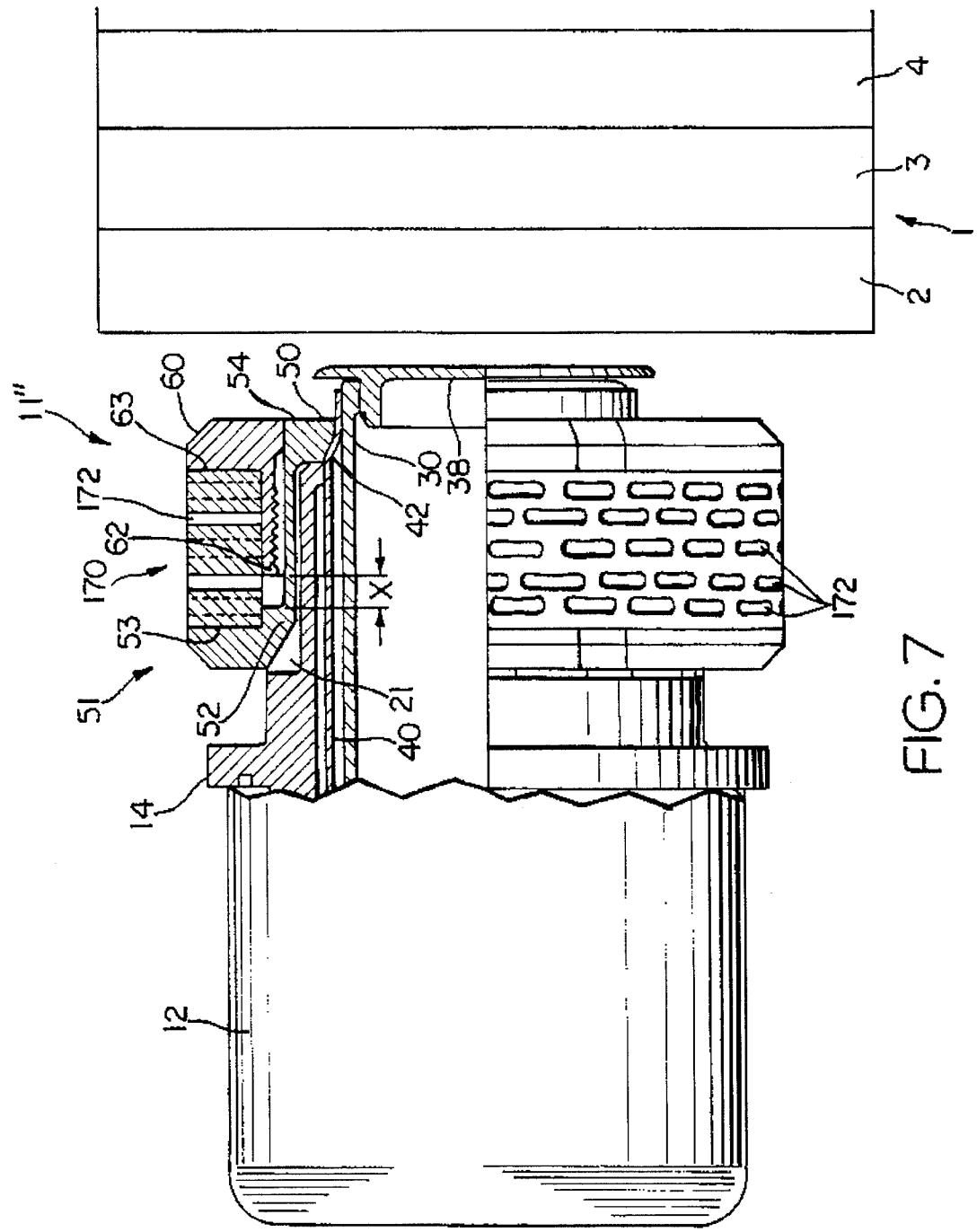
FIG. 7 is a partial section view of an alternative embodiment of a resilient means for the present invention.

FIG. 7 illustrates an alternative resilient means 170 that can be utilized in place of the disc member 70 in FIG. 1 and the plurality of disc members 70 in FIG. 5. Alternative resilient means or flexible tube 170 comprises a low modulus, high strength material such as titanium having a plurality of circumferentially extending openings 172 that effect such flexibility. Tube 170 is disposed between the radially inwardly extending steps 53 of the fingers 52 and 63 of the nut means 60. As the first ends 51 and 62 approach one another during the extension of piston 30 and deformable member or adjuster tube 40, flexible tube 70 will deform to permit clearance "X" to be taken up. Upon the termination of braking, flexible tube 170 will bias first ends 51, 62 away from one another in order to return the piston 30 and adjuster tube 40 to an at-rest position wherein first ends 51 and 62 are disposed apart from one another by the original clearance "X".

Figure 8:
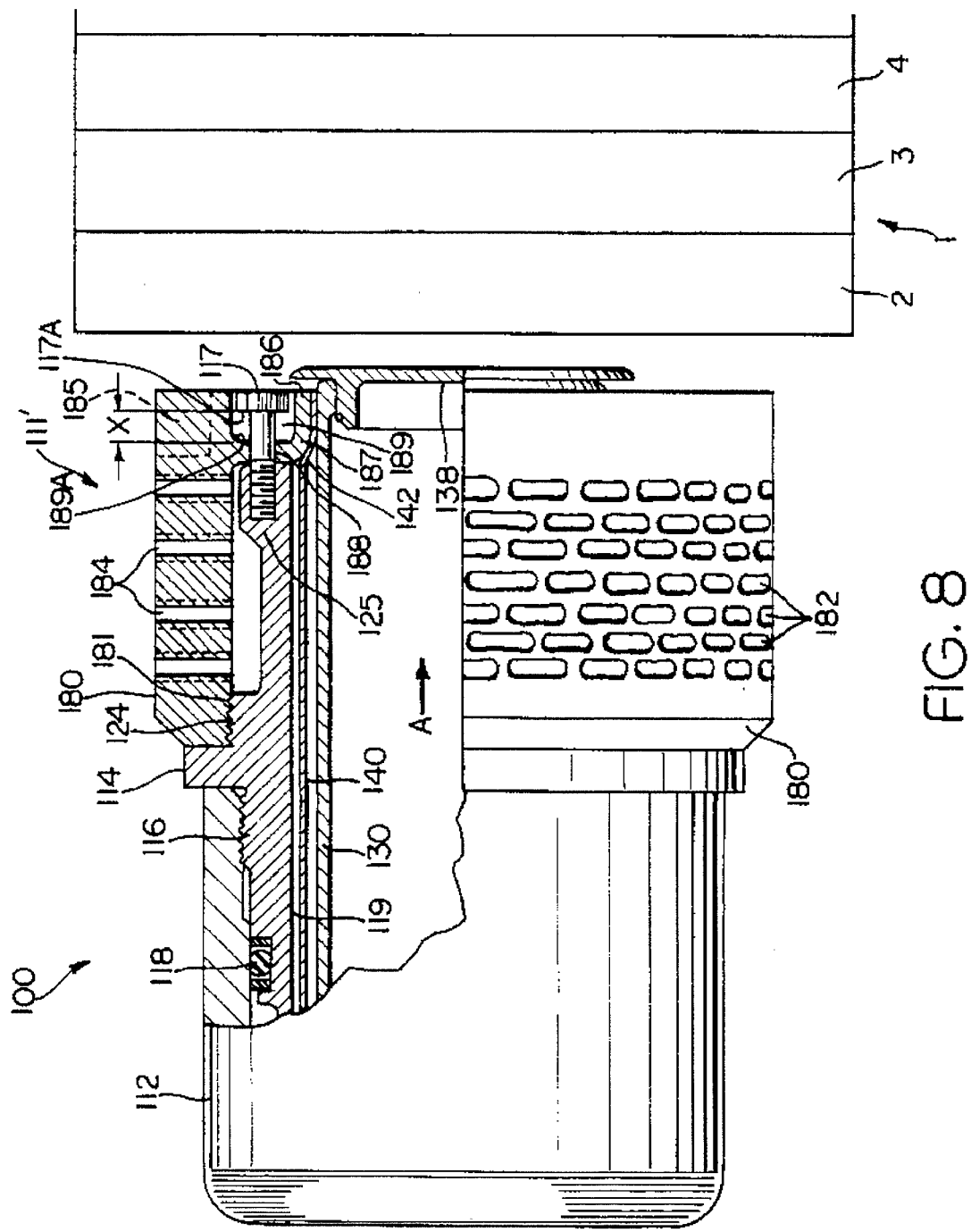
FIG. 8 is a section view of another embodiment of an aircraft brake piston adjusted assembly in accordance with the present invention.

FIG. 8 illustrates an alternative embodiment of the external concentric aircraft brake piston adjuster in accordance with the present invention. This embodiment eliminates the collar member 50 and nut means 60 in order to reduce the number of parts. Structure which is the same as the structure in FIG. 1 will contain the same reference numerals increased by 100. Aircraft brake piston adjuster 100 includes a bushing 114 having an outer radial threaded area 124 and a spaced apart, radially enlarged area 125 for receiving a plurality of bolts or screws 117. A resilient means comprising flexible member or tube 180 which is similar to flexible member or tube 170 described above, is made of a low modulus, high strength material such as titanium so that it has suitable resilience. Flexible member 180 includes threads 181 engaging the threaded portion 124 of the bushing 114, a plurality of circumferentially extending openings 182 to enhance deformability and flexibility, end hex shaped opening 185 to permit installation of the flexible member onto bushing 114 and installation of the assembly into the housing 112, and a radially inwardly extending portion 186. Radially inwardly extending portion 186 includes an end curved surface 187 that engages and deforms the deformable member 140 as it moves outwardly of the piston bore 119, a plurality of openings 188 which permit screws 117 to pass therethrough, and recessed areas 189 disposed about openings 188 so that there is a clearance "X" between the inner surfaces 117A of bolts 117 and the surfaces 189A of recesses 189. Clearance "X" comprises the piston return stroke. When hydraulic pressure is received within chamber 122 (not shown), the hydraulic brake pressure is applied to the piston end to force the piston axially outwardly of housing bushing bore 119. As piston 130 moves in the direction of arrow A in FIG. 8, the deformable member 140 displaces the radially inwardly extending portion 186 of flexible member 180 so that the clearance "X" is taken up and permits movement of adjuster tube 140 without deformation thereof. When piston 130 has extended at full brake pressure, the clearance "X" has been taken up and reduced to zero so that a worn brake stack 1 will result in the piston being biased further axially in the direction of arrow A and the clearance "X" is exceeded. As this occurs, piston 130 forces the adjuster tube 140 through the radially inwardly extending portion 186 and curved surface 187 (the flexible tube's swaging inner diameter) to permanently deform adjuster tube 140 and effect a repositioning of inwardly radially extending portion 186 relative to adjuster tube 140 and piston 130 and effect adjustment of the brake piston. At the termination of braking, flexible tube 180 by means of its radially inwardly extending portion 186 returns to the at-rest position illustrated in FIG. 8 to reestablish the clearance "X" between the surfaces 189A and 117A.

Figure 9:
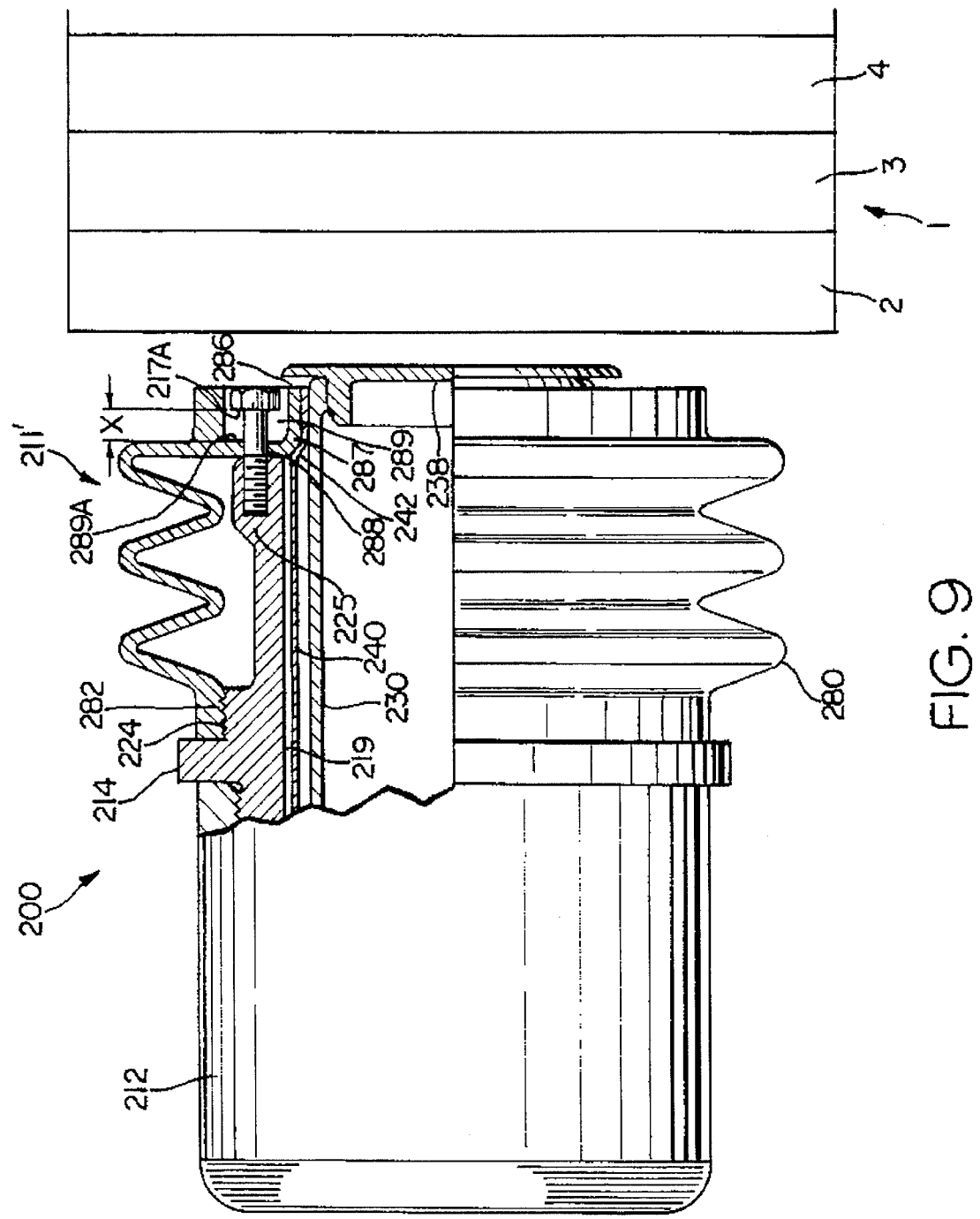
FIG. 9 is a partial section view of an alternative resilient means for the aircraft brake piston adjuster illustrated in FIG. 8.

FIG. 9 illustrates a further embodiment of a resilient means or flexible tube 280 which is a bellows spring. Bellows spring 280 includes structure similar to that of the flexible tube 180 illustrated in FIG. 8, and the same structure is indicated by the same reference numerals increased by 100. Clearance "X" is effected in the same manner, and operation of a brake piston adjuster 200 with the flexible tube 280 is identical to the operation described above for the brake piston adjuster 100 illustrated in FIG. 8.

The present invention can provide a more robust brake piston adjuster assembly than provided by prior concentric internal adjusters and external, non-concentric adjusters. The present invention requires fewer parts, and no small parts are necessary. The weight of the brake piston adjuster assembly may be slightly lower than prior assemblies, yet eliminates the problematic adjuster pin and seal, and the adjuster assembly is stationary to the piston housing, rather than stationary relative to the piston as are concentric internal adjusters, to afford additional isolation of the adjuster assembly from brake disk or heat stack vibration and heat.

I claim:

1. A brake piston adjuster assembly, comprising a brake piston slidable within a bore of a housing and extending to an open end of the bore, a deformable member located about the piston and displaceable therewith, a collar member located externally of said bore and adjacent the open end, the collar member separate from the piston and extending axially from a first end to a second radially inwardly extending end which engages the deformable member located about the piston, nut means located adjacent the collar member and connected with the housing so that the collar member is movable relative thereto, the nut means having a first end located adjacent the first end of said collar member, and resilient means disposed between said first ends of the collar member and nut means to bias the collar member toward the first end of said piston, so that movement of the piston and deformable member through the open end of the bore causes said collar member to move therewith and operate said resilient means until the first ends of the collar member and nut means engage whereupon the collar member deforms the deformable member as the piston moves outwardly of said bore.

2. The brake piston adjuster assembly in accordance with claim 1, wherein said deformable member comprises a cylindrical tube having an end located exteriorly of said bore and engaged deformably by the radially inwardly extending end of said collar member.

3. The brake piston adjuster assembly in accordance with claim 2, wherein said first end of the collar member comprises a plurality of axially extending fingers which are received within a plurality of axially extending slots in the housing.

4. The brake piston adjuster assembly in accordance with claim 3, wherein the housing includes a threaded exterior diameter area between each of said axially extending slots and the areas receive a threaded interior diameter area of said nut means.

5. The brake piston adjuster assembly in accordance with claim 4, wherein said resilient means comprises a disc spring.

6. The brake piston adjuster assembly in accordance with claim 1, wherein the first ends of the nut means and collar member each includes a radially inwardly extending step which receives and positions a respective part of the resilient means.

7. The brake piston adjuster assembly in accordance with claim 6, wherein the radially inwardly extending end of the collar member abuts a radially inwardly extending portion of the housing that also provides an interior shoulder for engagement by an interior end of the piston.

8. A brake piston adjuster assembly, comprising a brake piston slidable within a bore of a housing and extending to an open end of the bore, a deformable member located about the piston and displaceable therewith, and a brake piston adjuster including a deforming portion located externally of said bore to be separate from the piston and adjacent the open end, the deforming portion engaging the deformable member located about the piston, and resilient means biasing the deforming portion, so that movement of the piston and deformable member through the open end of the bore causes said deforming portion to move therewith and operate said resilient means such that subsequently the deforming portion deforms the deformable member as the piston moves outwardly of said bore.

9. The brake piston adjuster assembly in accordance with claim 8, wherein said deformable member comprises a cylindrical tube having an end located exteriorly of said bore and deformably engaged by the deforming member.

10. The brake piston adjuster assembly in accordance with claim 9, wherein said deforming member comprises a plurality of axially extending fingers which are received within a plurality of axially extending slots in the housing.

11. The brake piston adjuster assembly in accordance with claim 10, wherein the housing includes a threaded exterior diameter area between each of said axially extending slots and the areas receive a threaded interior diameter area of said brake piston adjuster.

12. The brake piston adjuster assembly in accordance with claim 8, wherein said resilient means comprises a disc spring.

13. The brake piston adjuster assembly in accordance with claim 8, wherein the brake piston adjuster receives and positions respective parts of the resilient means.

14. The brake piston adjuster assembly in accordance with claim 13, wherein the deforming portion abuts a radially inwardly extending portion of the housing that also provides an interior shoulder for engagement by an interior end of the piston.

15. The brake piston adjuster assembly in accordance with claim 14, wherein the radially inwardly extending portion of the housing engages and guides the deformable member.

16. The brake piston adjuster assembly in accordance with claim 8, wherein the resilient means comprises a cylindrical member having thereabout a plurality of circumferentially extending openings, the cylindrical member flexed when the piston and deformable member move through the open end of the bore.

17. The brake piston adjuster assembly in accordance with claim 16, wherein opposite axial ends of the cylindrical member are positioned between axially spaced apart portions of the brake piston adjuster.

18. The brake piston adjuster assembly in accordance with claim 17, wherein the brake piston adjuster comprises a collar member and nut means, the collar member engaging one end of the cylindrical member and axially displaced by movement of the deformable member.

19. The brake piston adjuster assembly in accordance with claim 17, wherein the cylindrical member is connected at one axial end with the housing and at the other axial end with the deformable member.

20. The brake piston adjuster assembly in accordance with claim 19, wherein the cylindrical member is axially tensioned by movement of the deformable member outwardly of the housing, and includes a plurality of recesses receiving connecting means disposed in recesses and engaged within the housing.

21. The brake piston adjuster assembly in accordance with claim 20, wherein the cylindrical member comprises a bellows shaped spring having a radially inwardly extending portion the engages the deformable member.

* * * * *